United States Patent [19]

Miwa

[11] Patent Number: 4,617,452
[45] Date of Patent: Oct. 14, 1986

[54] RICE COOKER

[75] Inventor: Yoshiyuki Miwa, Aichi, Japan

[73] Assignee: Kabushiki Kaisha Toshiba, Kawasaki, Japan

[21] Appl. No.: 678,799

[22] Filed: Dec. 5, 1984

[30] Foreign Application Priority Data

Dec. 13, 1983 [JP] Japan .......................... 58-191853[U]
Jan. 12, 1984 [JP] Japan .......................... 59-1730[U]
Jan. 13, 1984 [JP] Japan .......................... 59-3673[U]
Jan. 13, 1984 [JP] Japan .......................... 59-3674[U]
Jan. 13, 1984 [JP] Japan .......................... 59-3675[U]
Jan. 23, 1984 [JP] Japan .......................... 59-7901[U]

[51] Int. Cl.⁴ ............................................. H05B 3/42
[52] U.S. Cl. ...................................... 219/441; 219/440
[58] Field of Search ............... 219/431, 436, 440, 441, 219/442; 220/246, 334, 335; 16/252, 135, 191; 99/330; 126/369, 299 C; 49/2, 379

[56] References Cited

U.S. PATENT DOCUMENTS

| | | | |
|---|---|---|---|
| 2,102,342 | 12/1937 | Walder | 219/440 |
| 2,581,892 | 1/1952 | White | 220/335 X |
| 4,315,138 | 2/1982 | Miwa | 219/441 |
| 4,315,139 | 2/1982 | Onishi et al. | 219/441 |
| 4,375,711 | 3/1983 | Franzen et al. | 16/252 |

Primary Examiner—Clarence L. Albritton
Assistant Examiner—Teresa J. Walberg
Attorney, Agent, or Firm—Cushman, Darby & Cushman

[57] ABSTRACT

A rice cooker has a body provided with an upper opening. A lid for opening and closing the upper opening is swingably supported on the body by a hinge mechanism. The lid has a grip portion extending, like a bridge, along the upper surface of the lid from that portion thereof which is adjacent to the hinge mechanism to that portion thereof which is opposite to the hinge mechanism. The lid is locked at a closed position by a lock mechanism. A tension coil spring is arranged along the grip portion to urge the lid in the direction of opening the lid. Thus, when the lock mechanism is released, the lid is automatically opened by the urging force of the tension coil spring.

17 Claims, 11 Drawing Figures

RICE COOKER

BACKGROUND OF THE INVENTION

The present invention relates to a rice cooker and, more particularly, it relates to a rice cooker whose lid can be automatically opened by an urging member.

The rice cooker conventionally comprises a body for housing a heater, and a pot which is heated by the heater, a lid hinged to the body that can freely open or close, and a lock mechanism for holding the lid closed. The lid can be opened by releasing the lock mechanism and by holding and lifting the grip of the lid. There has been recently considered a rice cooker wherein a torsion coil spring is arranged at the hinged portion of the lid, one end of the spring being engaged with the body while the other end thereof being engaged with the lid, to force the lid to open, so that the lid can be automatically opened when the lid is released from the lock mechanism. This rice cooker makes it unnecessary to lift the lid by hand, that is, the user is freed from using unnecessary force to lift the lid.

The above-described rice cooker is satisfactory when considered from the viewpoint of convenience but it has the following problem when considered from the viewpoint of construction. In using the torsion coil spring, a great amount of stress is concentrated in those portions of the lid and body which are in contact with the ends of the spring. Therefore, these portions of the lid and body must be particularly reinforced against stress. The design and manufacture of the rice cooker becomes complicated accordingly, making the cost higher. In addition, the life of the torsion coil spring itself is relatively short and is not reliable over time.

SUMMARY OF THE INVENTION

The present invention is therefore intended to eliminate the above-mentioned drawbacks and its object is to provide a practical rice cooker, simple in design and manufacture, highly reliable in construction, and whose lid can be automatically opened.

To achieve the above object, according to an aspect of the present invention, there is provided a rice cooker comprising a body for housing a pot and provided with an upper opening through which the pot is taken into and taken out from the body; a lid swingably supported on the body through a hinge mechanism to open and close the upper opening, and having a grip portion extending along the upper surface of the lid from this portion of the lid which is adjacent to the hinge mechanism to that portion thereof which is opposite the hinge mechanism; a lock mechanism for locking the lid closed; and an elongate urging member arranged along the grip portion, one end being connected to the body adjacent to the hinge mechanism and the other end being connected to the lid so as to urge the lid to open.

According to the rice cooker having the abovedescribed arrangement, the lid can be automatically opened by the urging force of the urging member when the lock mechanism is released, thereby making the opening operation of the lid easier and more convenient. In addition, the elongate urging member is used instead of the torsion coil spring. Therefore, no large amount of stress is applied to the connecting portions of the body and lid to which the urging member is connected. It is not necessary, therefore, for the connecting portions of the body and lid to be reinforced, thereby making the design and manufacture of the rice cooker easier, and preventing the cost from being made higher. Further, the urging member such as a tension coil spring has a longer life than the torsion coil spring, and also has a higher reliability when used for a long time.

BRIEF DESCRIPTION OF THE DRAWINGS

FIGS. 1 through 5 show a rice cooker according to a first example of the present invention, in which FIG. 1 is an exploded perspective view of the rice cooker, FIG. 2 is a side view showing the rice cooker partially cut away, FIG. 3 is a sectional view showing a hinge portion of the rice cooker enlarged when the lid is closed, FIG. 4 is an exploded perspective view showing a lock mechanism of the rice cooker, and FIG. 5 is a sectional view showing the hinge portion of the rice cooker enlarged when the lid is opened;

FIGS. 6 through 8 show a rice cooker according to a second example of the present invention, in which FIG. 6 is a perspective view showing a hinge portion of the rice cooker, and FIGS. 7 and 8 are sectional views showing the hinge portion of the rice cooker when the lid is opened at different angles;

FIGS. 9 through 11 show a rice cooker according to a third embodiment of the present invention, in which FIG. 9 is a side view showing the rice cooker partially cut away, FIG. 10 is a sectional view showing a part of a lock mechanism enlarged, and FIG. 11 is an exploded perspective view of the lock mechanism.

DETAILED DESCRIPTION OF THE PREFERRED EMBODIMENTS

Some embodiments of the present invention will be described in detail referring to the accompanying drawings.

Figure 1:
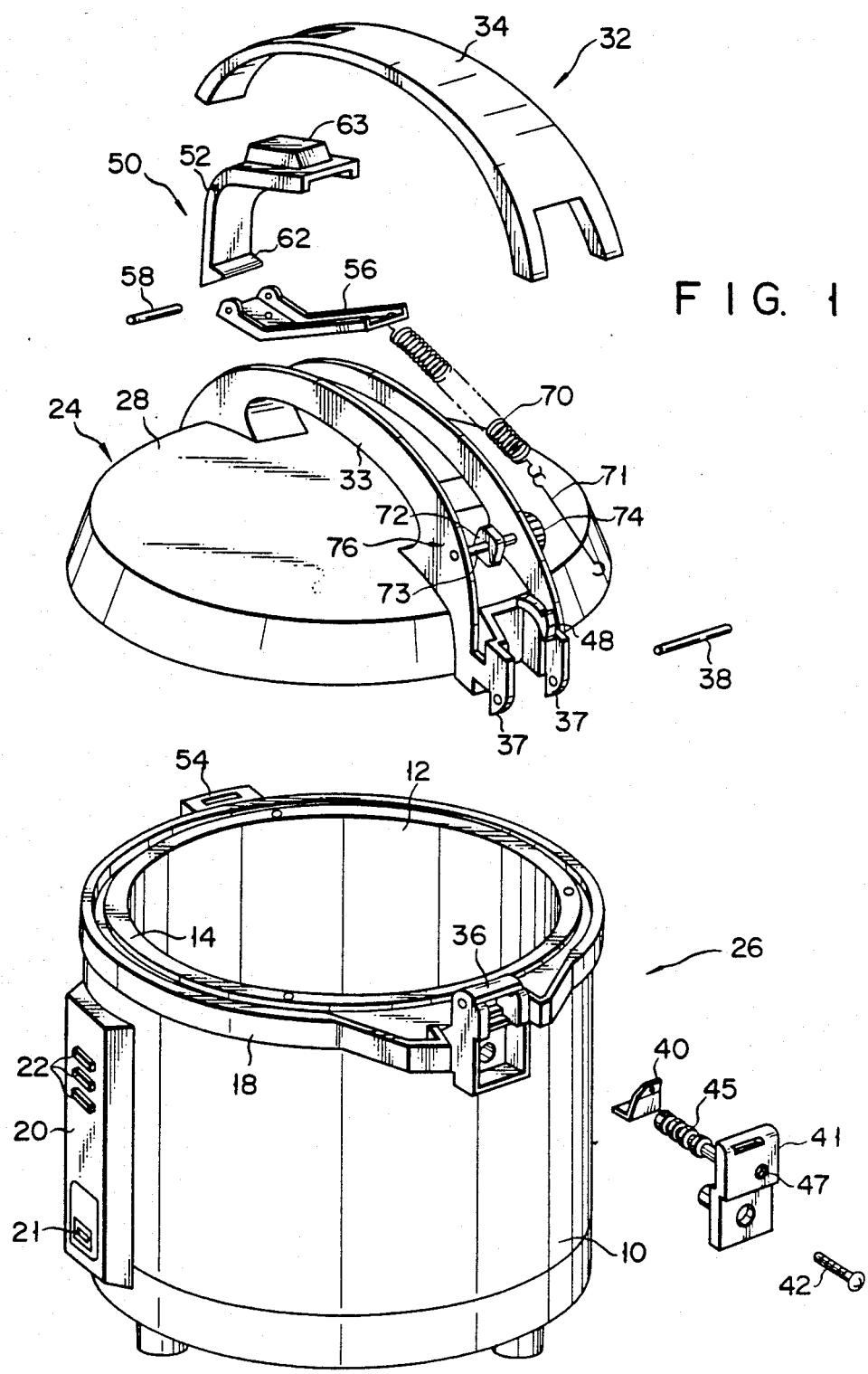
Figure 2:
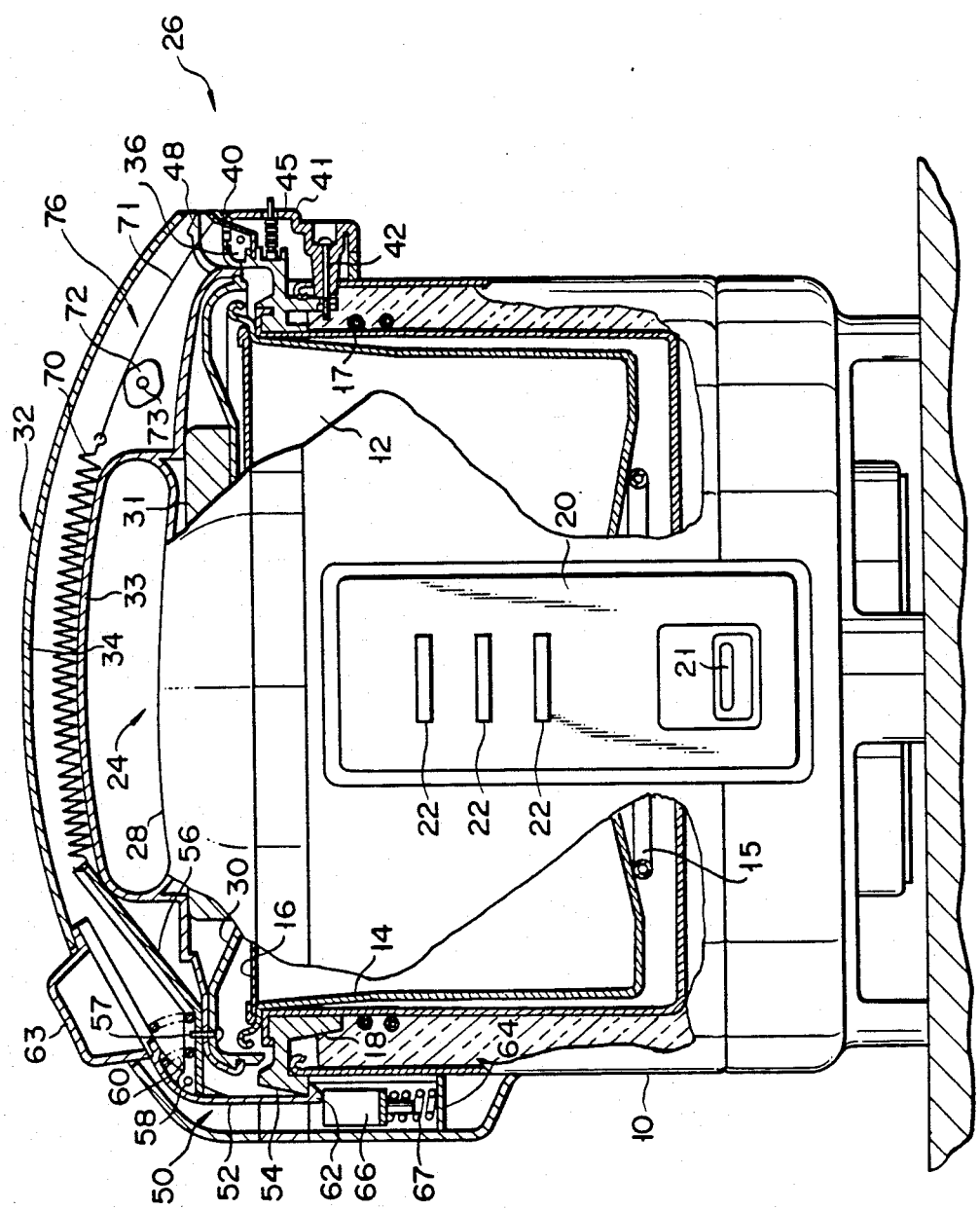

FIGS. 1 through 5 show a rice cooker according to a first embodiment of the present invention. As shown in FIGS. 1 and 2, the rice cooker has a cylindrical body 10 with a bottom. In the body 10, a pot 14 for storing rice and water which can be detached through an upper opening 12 of the body, and a heater (not shown) for heating the pot are arranged. An inner cover 16 covering the opening of the pot 14 is housed in the body 10, and a ring-shaped outer frame 18 is fixed to the circumferential edges of the cylindrical walls of the body 10. Heat insulating materials are arranged between the cylindrical walls of the body 10. An operation panel 20 is attached to the outer cylindrical wall of the body 10, and a rice cooking switch operating lever 21, and display lamps 22 for displaying the condition of the cooked rice are arranged at the operation panel 20.

A lid 24 for opening and closing the upper opening 12 is swingably attached to the top of the body 10 through a hinge mechanism 26. To give more detail, the lid 24 includes substantially circular outer and inner lids 28 and 30 which are fitted with each other, and a heat insulating material 31 is arranged between the inner and outer lids. Arranged on the outer lid 28 is a grip portion 32 extending, like a bridge, in the diameter direction of the lid 24 from this portion of the lid which is adjacent to the hinge mechanism 26 to that portion thereof which is opposite to the hinge mechanism 26. The grip portion 32 includes a base portion 33 made integral to the outer lid 28, and a cover 34 attached to the base portion to close the upper opening of the base portion. The grip portion 32 thus makes a hollow.

Figure 3:
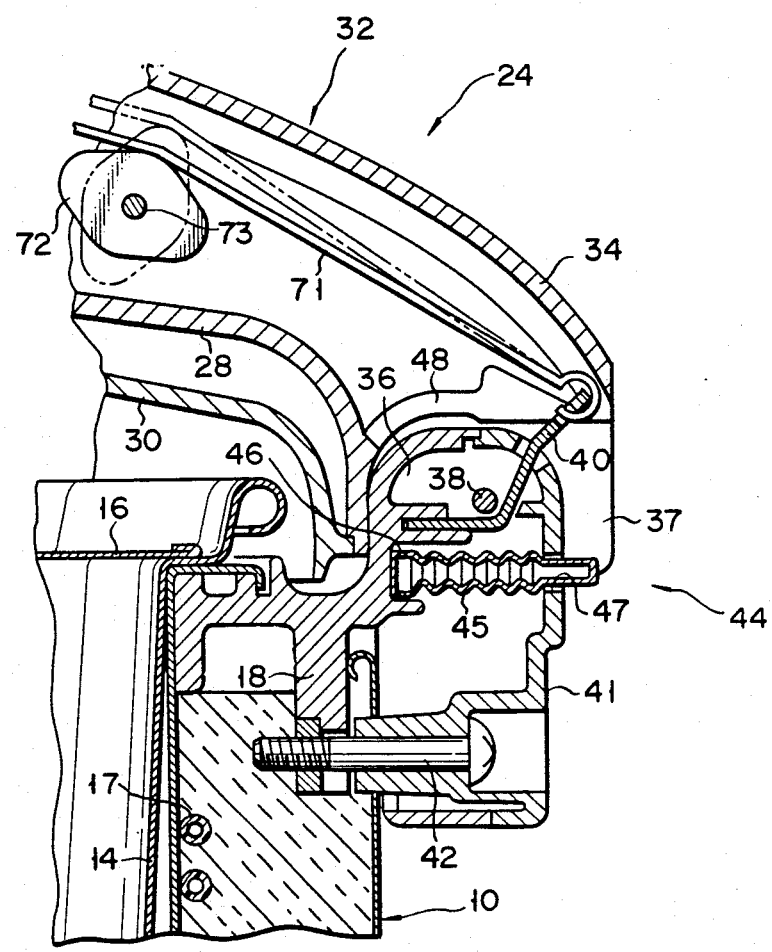

As shown in FIGS. 1 through 3, the hinge mechanism 26 has a hinge receiving portion 36 formed on the right side (when viewed in FIG. 2) of the outer frame 18 and a pair of hinge pieces 37 formed at that end of the base portion 33 of the grip portion 32 which is located on the side of the hinge mechanism 26. The hinge pieces 37 are fitted onto the hinge receiving portion 36 to sandwich the latter between them, and a hinge pin 38 is then inserted traverse through these fitted hinge pieces and hinge receiving portion, thereby enabling the whole of the lid 24 to be swingably pivoted on the body 10. A hook piece 40 for a tension coil spring, as an elongate urging member, which will be described later is arranged in the hinge receiving portion 36 and attached to the outer frame 18 together with a hinge cover 41 by means of a screw 42. The hinge cover 41 is formed to cover the hinge receiving portion 36.

Figure 5:
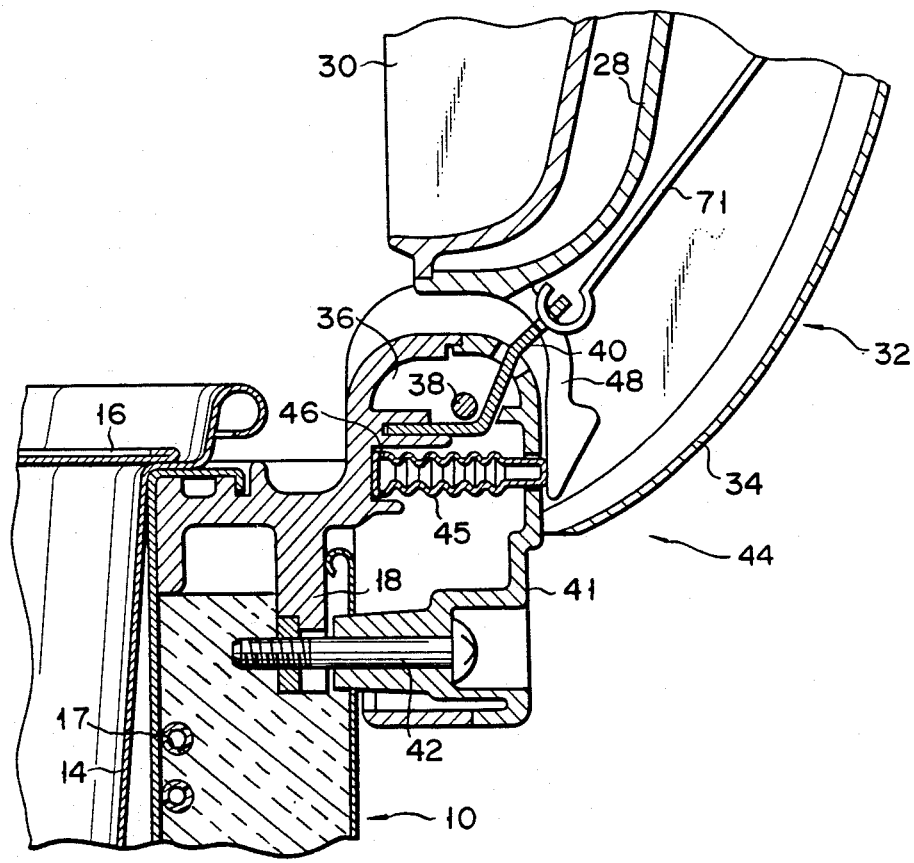

In the hinge receiving portion 36 is arranged a shock absorbing member 45 which forms part of a shock absorbing mechanism 44 for absorbing shock caused at the time when the lid 24 is opened. This shock absorbing member 45 includes a circular bellows made of elastic material, for example, and sealed but a small hole 46 formed at the base end thereof. The shock absorbing member 45 is contacted with the outer frame 18 at the base end thereof, while the foremost end thereof projects outside through a hole 47 in the hinge cover 41. As seen from FIG. 3, the shock absorbing mechanism 44 has a projection 48 extending from that end of the grip portion 32 which is located on the side of the hinge mechanism 26 and along the upper surface of the hinge cover 41. As shown in FIG. 5, this projection 48 contacts the foremost end of the shock absorbing material 45 at the time when the lid 24 is opened, thereby enabling shock, which acts on the lid at the time when the lid is opened, to be absorbed by the absorbing member through the projection 48.

Figure 4:
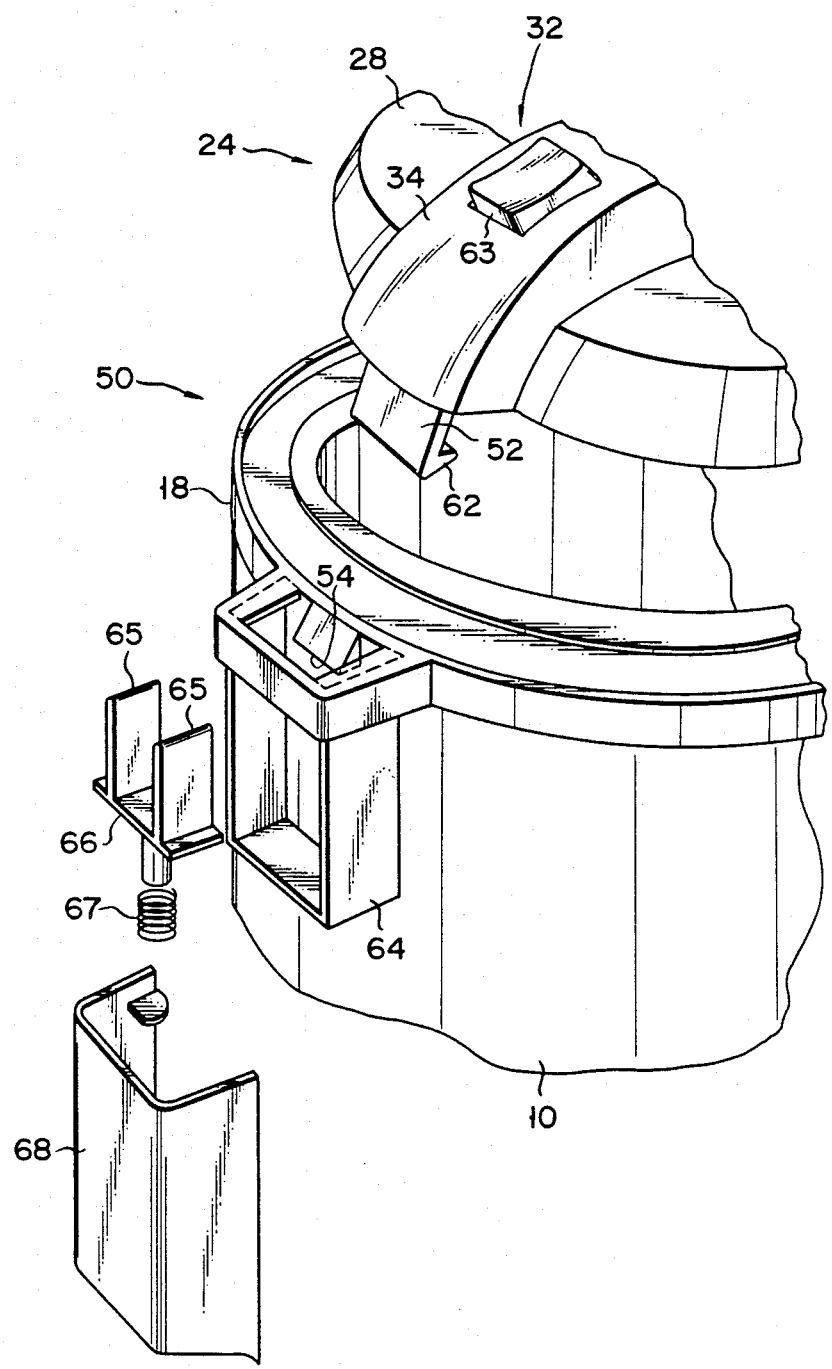

On the other hand, the lid 24 is locked at its closed position by a lock mechanism 50 which is located opposite to the hinge mechanism 26. As shown in FIGS. 1, 2 and 4, the lock mechanism 50 has a lock lever 52 attached to the lid 24, and a hook 54 located on the side of the body 10 to hook the lock lever. The hook 54 is formed on the left side of the outer frame 18 or the side opposite to the hinge mechanism 26, when viewed in FIG. 2. The lock lever 52 is attached to a base plate 56 which is fixed to that portion of the outer lid 28 which is opposite to the hinge mechanism 26. The base plate 56 is fixed onto the upper surface of the outer lid 28 by means of a screw 57 which is screwed into the inner and outer lids from the underside of the inner lid 30, and the lock lever 52 is swingably pivoted on the base plate by a pin 58 at the intermediate portion thereof. The lock lever 52 and the base plate 56 are located inside the grip portion 32. Arranged between the lock lever 52 and the base plate 56 is a compression coil spring 60 by the urging force of which the lock lever 52 is urged in the counterclockwise direction around the pin 58. When a claw 62 at the foremost end of the lock lever 52 is engaged with the hook 54, the lid 24 is locked in a position where it closes the upper opening of the body 10. Reference numeral 63 represents a push button formed at the other end of the lock lever 52 and projecting outside through an opening of the grip cover 34.

As apparent from FIGS. 2 through 4, a U-shaped, support frame 64 is attached to the outer cylindrical wall of the body 10 and extends downward from both sides of the hook 54. Arranged inside the support frame 46 are a lifter 66 which has two projections 65 erected parallel to each other and separated from each other by a distance a little smaller than the width of the claw 62 of the lock lever 52, and also an auxiliary spring 67 which is a compression coil spring for urging the lifter 66 upward or in the direction of the hook 54. The support frame 64 is covered by a cover 68.

As shown in FIGS. 1 through 3, a tension coil spring 70 as an elongate urging member is arranged inside the grip portion 32, extending along the longitudinal direction thereof. One end of the spring 70 is hooked up by the base plate 56 and connected to the lid 24 via this base plate, while the other end thereof by the hook piece 40 through a non-expansion line member 71 and to the body 10 through this hook piece. The whole of the lid 24 is urged by the tension coil spring 70 in the direction of opening the lid 24.

A diamond-shaped cam 72 is arranged under the line member 71 in the grip portion 32 and rotatably supported by a pin 73. The outer circumference of the cam 72 is in contact with the line member 71. One end of the pin 73 projects traverse from the grip portion 32 and is provided with a knob 74 by which the cam is rotated. The cam 72 is rotated to press the line member 71 and adjust the urging force of the spring 70, thus forming an adjustment mechanism 76. Although not shown, a holding mechanism for holding the cam 72 every rotation of the knob 74 is provided.

According to the rice cooker of the first embodiment having the above-described arrangement, the projections 65 of the lifter 66 are pushed downward in the support frame 64 by the claw 62 of the lock lever 52, keeping the auxiliary spring 67 compressed, when the lid 24 is closed and locked by the lock mechanism 50. The urging force which tends to return to its original shape is thus stored in the auxiliary spring 67. When the button 63 of the lock lever 52 is pushed under this state to release the claw 62 from the hook 54, the lock of the lid 24 is released. At the same time, the lifter 66 is also released from its pushed state. Therefore, the lid 24 is lifted by the urging force of the auxiliary spring 67 through the lifter 66 and the lock lever 52 by a length which corresponds to the expansion of the auxiliary spring, and it is then swung upward round the hinge pin 38 by the force applied from the tension coil spring 70, thereby leaving it automatically and completely opened.

According to the rice cooker, therefore, it becomes unnecessary to lift the lid by hand, that is, the user can be freed from using unnecessary force to lift the lid. This is very convenient. In addition, the rice cooker employs a tension coil spring 70 instead of the conventionally-used torsion coil spring. Such severe stress applied from both ends of the conventionally-used torsion coil spring to the lid and body would not be applied to the lid 24 and body 10 if the tension coil spring 70 was used. It is therefore unnecessary to reinforce the lid 24 and body 10 as in the conventional case, so that their design and manufacture can be made easier, preventing the manufacturing cost from being increased. In addition, the tension coil spring 70 has a longer life than the torsion coil spring, making it more reliable over time. Further, the tension coil spring 70 is arranged in the inside space of the hollow grip portion 32 which was not used conventionally. Therefore, this enables dead space to be effectively used without requiring a change in appearance, thereby also contributing toward preventing the product's cost from being increased.

Since the other end of the tension coil spring 70 is hooked up to the base plate 56 of the lock mechanism 50 and is connected to the lid through this base plate, the base plate can be used as a connecting member between the spring 70 and the lid, thereby eliminating the need for an extra part and thereby also contributing toward keeping the product's cost low. One end of the tension coil spring 70 is connected to the hook piece 40, for example, or to the body 10 through a line member 71 such as wire or string. Therefore, connecting the tension coil spring 70 can be achieved without fail even when the shape of the grip portion 32 becomes complicated or the inside thereof becomes narrow.

As described above, the lid 24 is lifted by a predetermined distance by means of the auxiliary spring 67 just after its release from the lock mechanism. Because the lid 24 still has large inertia force just after its lock is released, it cannot be lifted only by the tension coil spring 70. However, the lid 24 can be lifted using an auxiliary spring 67 and when it is thus lifted, it can be swung to its completely opened position by means of the tension coil spring 70. Therefore, those springs which do not have strong elasticity can be used as the tension coil spring 70 to prevent the lid 24 from opening at an abnormally high speed and from striking the user and or damaging the body 10 itself. In addition, the tension coil spring applies no severe stress to the lid 24 and body 10, not to the auxiliary spring 67 which serves only to lift the lid 24 a predetermined distance after the lock on the lid 24 is released. Therefore, no part of the rice cooker can be deformed or broken by these springs, thereby enabling the life of the rice cooker to be made longer.

When the lid 24 is fully opened as described above, the projection 48 which is part of the lid 24 strikes and pushes the foremost end of the shock absorbing member 45 which projects from the hinge cover 41, as shown in FIG. 5. The shock absorbing member 45, which is thus pushed or pressed, contracts gradually discharging the air inside through the small hole 46. Thus, the opening speed of the lid 24 is reduced by the shock absorbing member 45. More specifically, the shock which is applied to the body 10 by the lid 24 when the lid is opened can be absorbed by the shock absorbing member 45. Therefore, no severe shock is added to the body, thereby preventing the body 10 from shaking or falling when the lid is opened. Further, the condensation attached to the lid, particularly to the inner lid 30, can be prevented from splattering when the lid 24 is opened.

When the knob 74 of the adjustment mechanism 76 is rotated, the cam 72 can also be rotated accordingly. When the cam 72 is rotated, the contact point between the outer circumference of the cam 72 and the line member 71 is changed, as shown in FIG. 3. This change means that the distance from the pin 73 to the line member 71 is also changed. Therefore, the line member 71 can be lifted up or down to change the tension of the tension coil spring 70. The urging force of the tension coil spring 70 thus changed changes the force with which the lid 24 is opened. In the case where the lid 24 is not automatically opened or the opening speed of the lid 24 is either too low or high because of irregularities in the parts themselves or in their assembly, where the lid is not automatically opened or the lid opening speed is reduced substantially because the spring force of the tension coil spring 70 is reduced due to aging, or where the lid is not opened sufficiently because the plane on which the body 10 is mounted is slanted, the knob 74 may be rotated to adjust the spring force of the tension coil spring 70. More specifically, the knob 74 may be operated to strengthen the spring force of the tension coil spring (or to lift the line member 71) to increase the opening speed of the lid 24, and it may be operated in another direction to lessen the spring force of the tension coil spring (or lowering the line member 71) to reduce the opening speed of the lid 24. The lid can thus be stably and satisfactorily opened in any situation.

It should be understood that the present invention is not limited only to the embodiment which has been described above and shown in the drawings, but can be changed and modified without departing from the scope of the present invention.

The shock absorbing member is not limited to cylindrical bellows, but may be of any appropriate elastic material which has the necessary shock absorbing capacity. Although one end of the tension coil spring is connected to the body through the line member, it may also be connected directly to the body without using the line member. Further, the rice cooker may be arranged like the second and third embodiments which will be described below.

Figure 6:
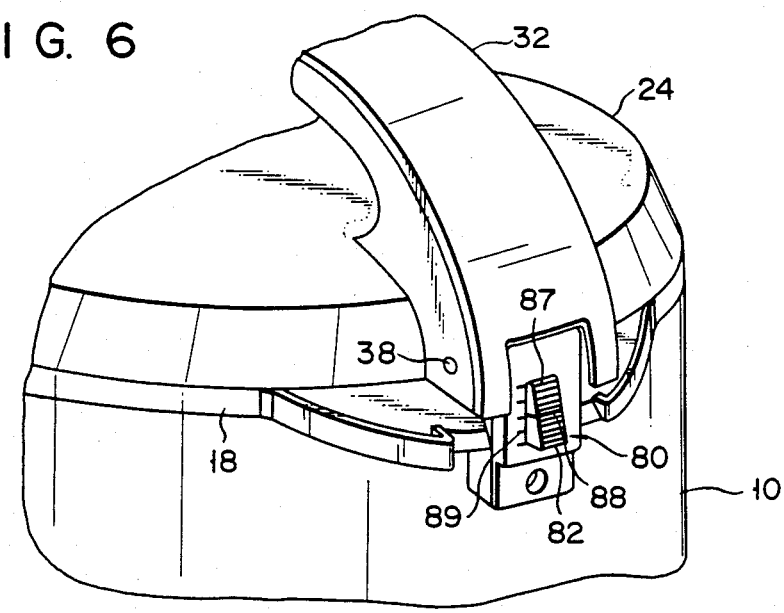
Figure 7:
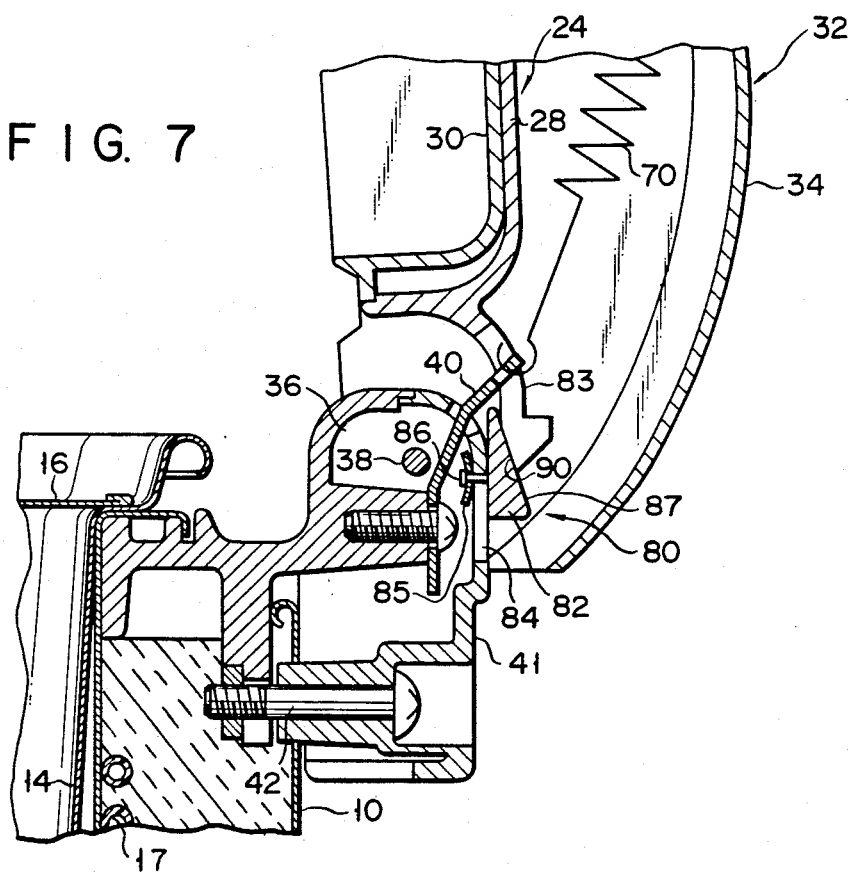
Figure 8:
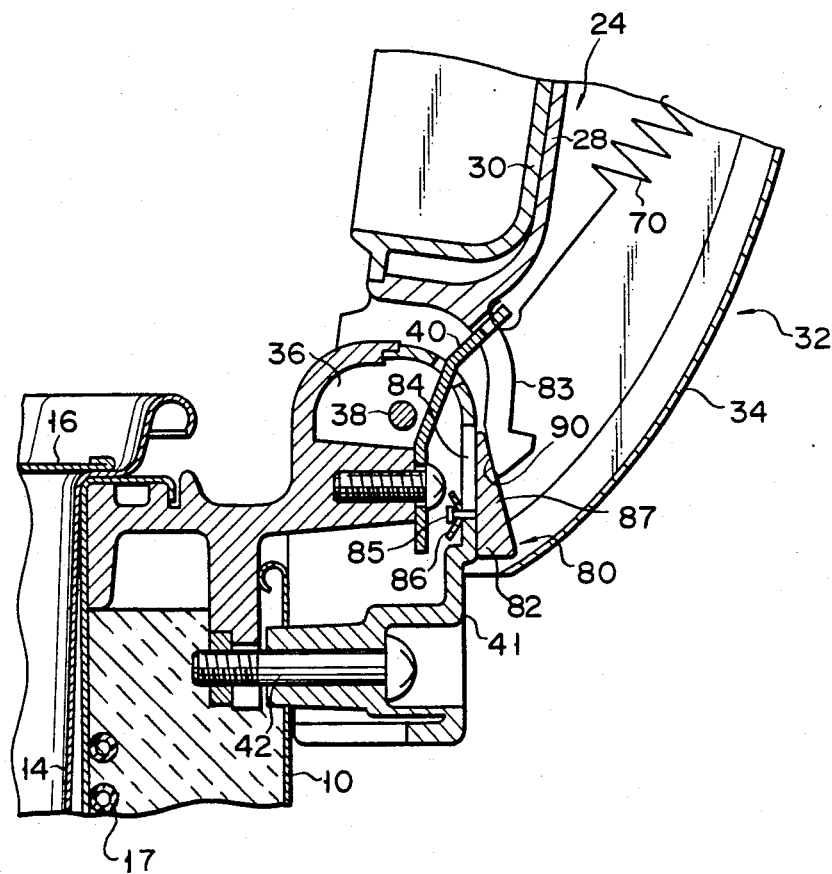

FIGS. 6 through 8 shows a rice cooker according to a second embodiment of the present invention. According to this embodiment, an angle adjusting mechanism for adjusting the angle of the lid opened is provided instead of the shock absorbing mechanism. The second embodiment is same in construction as the first one except for the angle adjusting mechanism, and a description on the same parts as those in the first embodiment will be omitted accordingly. The angle adjusting mechanism 80 has a stopper member 82 movably attached to the hinge cover 41, and a projection 83 extending from that end of the grip portion 32 which is located on the side of the hinge mechanism and along the outer surface of the hinge cover. The hinge cover 41 is provided with a guide hole 84 which extends vertically. The stopper member 82 has a support leg 85 projected therefrom, and it is made to be slidable or adjustable in the vertical direction by inserting its support leg 82 through the guide hole 84 and fastening the leg with a stopper ring 86. The stopper member 82 has a slope 87. A mark 88 is formed on the slope 87 and both sides of the stopper member 82, as shown in FIG. 6, while graduations 89, for example, five graduations are marked on the hinge cover 41, corresponding to the mark 88. A slope 90 is formed at the foremost end of the projection 83, corresponding to the slope 87 of the stopper member 82.

When the lid 24 is automatically opened by the urging force of the tension coil spring 70 in the second embodiment having the above-described arrangement, the slope 90 of the projection 83 which extends from the lid 24 strikes the slope of the stopper member 82 attached to the body 10, thereby stopping the further swinging of the lid. When the stopper member 82 is located at the uppermost position, as shown in FIG. 7, the lid 24 is only slightly open because the projection 83 is the first to strike the stopper member. On the other hand, when the stopper member 82 is located at the lowest position as shown in FIG. 8, the lid 24 is opened as much as possible because the projection 83 strikes the stopper member last. In addition, since the stopper member 82 can be freely located between the uppermost and lowest positions, the opening angle of the lid 24 can be freely set, thereby enabling the lid to be stopped at any optional opening angle.

In the case of the second embodiment, the stopper member 82 is slid to adjust its position. Therefore, adjusting the opening angle of the lid 24 can be achieved only by sliding the stopper member. In addition, the graduations 89 for adjusting the position of the stopper member 82 are marked on the body 10 actually on the hinge cover 41 itself. Therefore, adjusting the position of the stopper member can be achieved easily and accurately.

Since the second embodiment is provided with the angle adjusting mechanism 80 described above, the lid can be opened and stopped at an optimum angle, according to the circumstances under which the rice cooker is used. That is, the distance between the rice cooker and the wall, or the distance between the rice cooker and other equipment, for example can be accounted for, thereby making the rice cooker convenient to use and preventing it from damaging other appliances. In addition, the lid is stopped at an optional angle not by friction, but by restraining caused when the projection 83 is slidingly contacted with the stopper member 82. Therefore, opening the lid need not be difficult, making it unnecessary to restrict the size of the parts and the precision with which they are assembled. Further, the angle adjustment mechanism will not lose its effect even when used for a long time.

It should be understood that in the second embodiment, the concrete arrangement of the angle adjusting mechanism; including a means of adjusting the position of the stopper member and the provision of graduations, can be changed or modified as needed.

Figure 9:
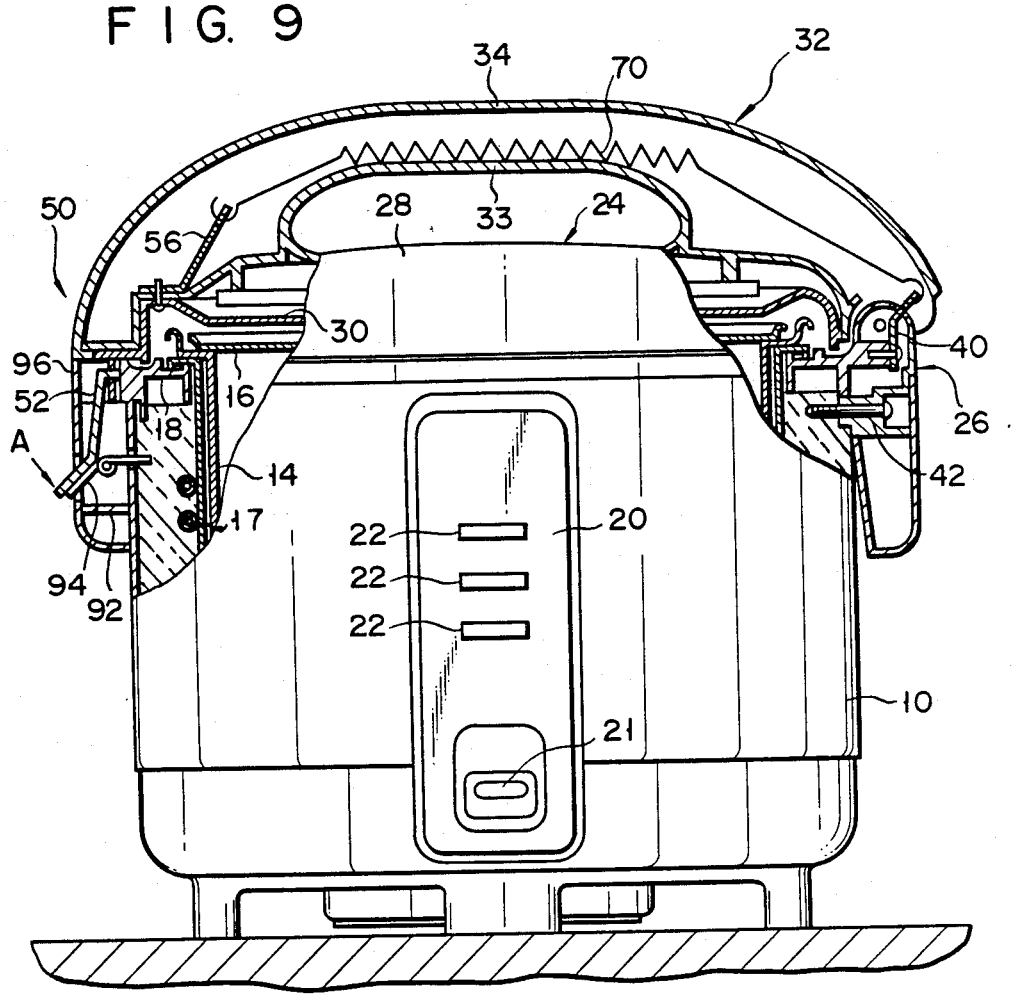
Figure 10:
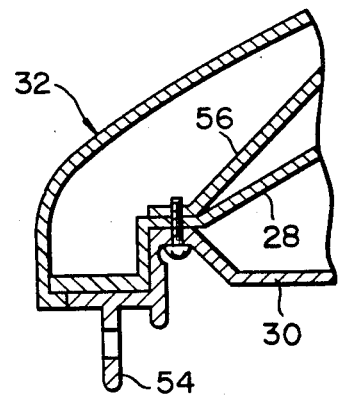
Figure 11:
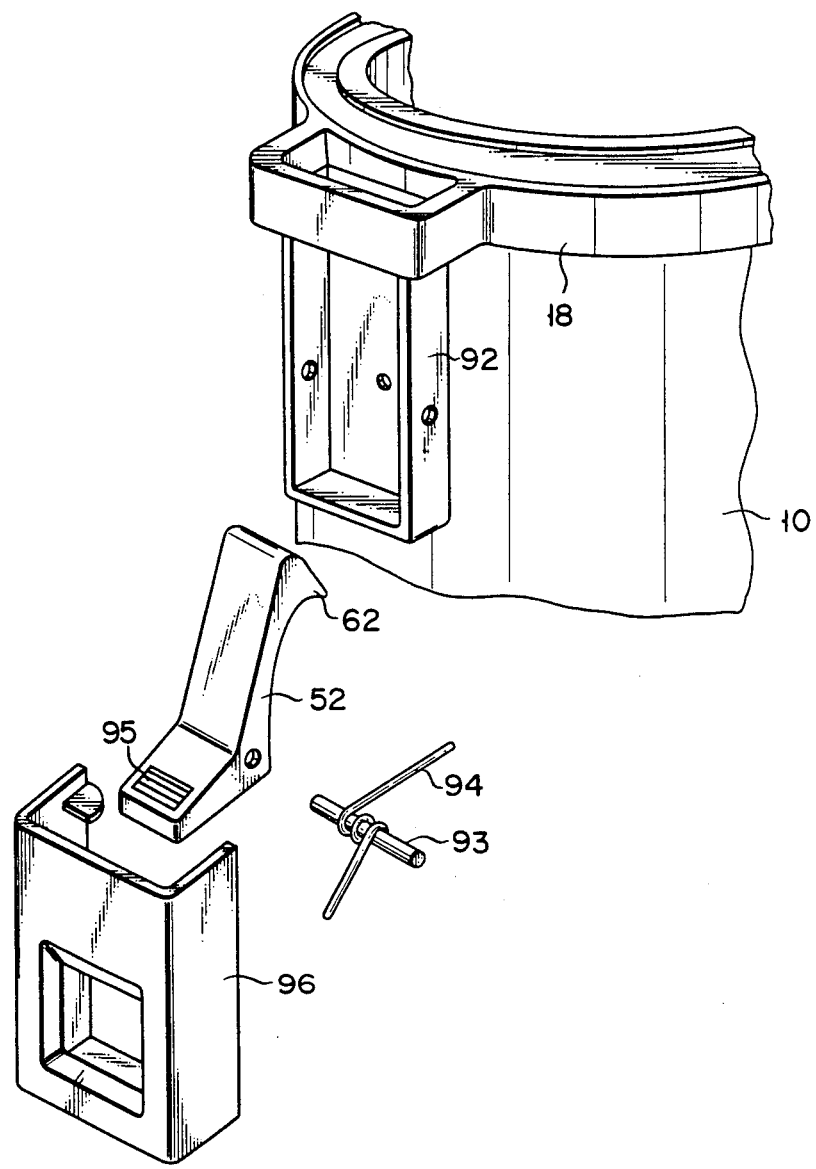

FIGS. 9 through 11 show a rice cooker according to a third embodiment of the present invention. This third embodiment differs from the first one in its lock mechanism, but its other parts are substantially same as those of the first embodiment, and a description of these same parts will be omitted accordingly. In the third embodiment, a lock mechanism 50 has a hook 54 located on the side of the lid 24 and a lock lever 52 located on the side of the body 10. As apparent from FIG. 10, the hook 54 is made integral to the inner lid 30, projecting toward the body 10. The lock lever 52 is swingably supported by a pin 93 in a U-shaped support frame 92 which is formed integral to the outer cylindrical wall of the body 10. The lock lever 52 is usually urged counterclockwise or in a direction reverse to the operating direction A of its operating portion 95 by means of a torsion coil spring 94 fitted onto the pin 93. A claw 62 of the lock lever 52 is thus engaged with the hook 54 to lock the lid 24 closed.

According to the third embodiment having the above-described arrangement, the lock lever, the spring for urging the lock lever, and the like are located not on the side of the lid 24 but on the side of the body 10. Therefore, the weight of the lid can be reduced and the center of gravity of the lid can be made to approach the hinge. As a result, the rice cooker can be held stable and will not fall when the lid is opened. Since the lid is opened by pushing the lock lever attached to the body, the smooth opening of the lid will not be disturbed by the pressure of the hand. In addition, there is no fear that the lid will open accidently by pushing the lock lever when the rice cooker is carried while gripping the grip portion by hand. Since the lock lever is not located in the grip portion, it becomes unnecessary to provide a space in the lid in which the lock lever is housed, thereby enabling the lid to be made compact and its design to be enhanced. In addition, the inside of the lid can be air-tightly sealed, preventing vapor from entering into the lid. Since the lock lever has little contact with vapor, it becomes unnecessary to make the lock lever heat-resistant, thereby enabling the manufacturing cost to be made low.

In the above-mentioned embodiments, the urging member is not limited to the tension coil spring, but it may be an elongate elastic member made of a synthetic rubber, for example.

What is claimed is:

1. A rice cooker comprising:
    a body having an upper opening;
    a pot for containing therein water and rice to be cooked, the pot being configured so that it can be placed in the body and taken out of the body through the upper opening, the body being configured so as to hold the pot;
    means for heating the pot and any water and rice contained therein, so as to cook the rice;
    a lid for opening and closing the upper opening;
    support means for swingably supporting the lid relative to the body, said lid having a grip portion extending along the upper surface of the lid from that portion of the lid which is adjacent to the support means to that portion thereof which is opposite to the support means;
    a lock mechanism for locking the lid to close the upper opening;
    an elongate urging member arranged along the grip portion, one end thereof being connected to the body adjacent to the support means, the other end thereof being connected to the lid, to urge the lid in the direction of opening the lid.

2. A rice cooker according to claim 1, wherein said grip portion ismade hollow and the urging member extends in the grip portion.

3. A rice cooker according to claim 2, wherein said lock mechanism includes a support plate arranged in the grip portion at a position opposite to the support means, a lock lever swingably supported by the support plate, and an engaging portion formed at the edge of the upper opening of the body to engage with the lock lever at the time of closing the lid.

4. A rice cooker according to claim 3, wherein the other end of said urging member is connected to the support plate.

5. A rice cooker according to claim 2, wherein one end of said urging member is connected to the body through a non-contractible line member which is arranged in the grip portion.

6. A rice cooker according to claim 5, which further comprises an adjusting mechanism for adjusting the urging force of the urging member.

7. A rice cooker according to claim 6, wherein said adjusting mechanism includes a cam rotatably arranged in the grip portion and provided with a circumferential face contacted with the line member, and a knob for rotating the cam from outside.

8. A rice cooker according to claim 1, which further comprises a shock absorbing mechanism for absorbing shock applied to the body and the lid when the lid is opened.

9. A rice cooker according to claim 8, wherein said shock absorbing mechanism includes a shock absorbing member arranged at the body, adjacent to the support means, and a projection extending from the lid, adjacent to the support means, to abut against the shock absorbing member when the lid is opened.

10. A rice cooker according to claim 9, wherein said shock, absorbing member is a cylindrical bellows.

11. A rice cooker according to claim 1, which further comprises lift means for lifting the lid in the direction of opening the lid at the initial time of lid opening process.

12. A rice cooker according to claim 11, wherein said lift means includes a lift piece arranged at that portion of the upper opening edge of the body which is opposite the support means, to be capable of abutting against the lid, and an auxiliary urging member for urging the lift piece in the direction of opening the lid.

13. A rice cooker according to claim 1, wherein said lock mechanism includes a lock lever swingably attached to that portion of the upper opening edge of the body which is opposite to the support means, and an engaging portion formed at the lid to engage the lock lever when the lid is closed.

14. A rice cooker according to claim 1, which further comprises an angle adjusting mechanism for adjusting the angle of the lid opened.

15. A rice cooker according to claim 14, wherein said angle adjusting mechanism includes a stopper member movably attached to the body, adjacent to the support means, and a projection extending from the lid, adjacent to the support means, to contact the stopper member when the lid is opened, and wherein the angle of the lid opened is adjusted by changing the position of the stopper member to change the contact position between the stopper member and the projection.

16. A rice cooker according to claim 15, wherein said angle adjusting mechanism includes a mark formed on the stopper member, and graduations separated from one another by a certain distance in the moving direction of the stopper member and marked on the body to correspond to the mark.

17. A rice cooker according to claim 1, wherein said urging member is a tension coil spring.

* * * * *